US009033429B2

(12) United States Patent
Waida et al.

(10) Patent No.: US 9,033,429 B2
(45) Date of Patent: *May 19, 2015

(54) BRAKE CONTROL DEVICE

(75) Inventors: Kazuma Waida, Hyogo (JP); Kenichi Jino, Hyogo (JP); Manabu Kokawa, Hyogo (JP); Junya Iwatsuki, Kanagawa (JP); Shunsaku Ono, Kanagawa (JP)

(73) Assignees: Bosch Corporation, Tokyo (JP); Kawasaki Jukogyo Kabushiki Kaisha, Hyogo (JP)

( * ) Notice: Subject to any disclaimer, the term of this patent is extended or adjusted under 35 U.S.C. 154(b) by 235 days.

This patent is subject to a terminal disclaimer.

(21) Appl. No.: 13/500,793

(22) PCT Filed: Oct. 13, 2010

(86) PCT No.: PCT/JP2010/067941
§ 371 (c)(1),
(2), (4) Date: Apr. 6, 2012

(87) PCT Pub. No.: WO2011/046136
PCT Pub. Date: Apr. 21, 2011

(65) Prior Publication Data
US 2012/0200148 A1    Aug. 9, 2012

(30) Foreign Application Priority Data
Oct. 13, 2009    (JP) .................................. 2009-236666

(51) Int. Cl.
*B60T 8/88* (2006.01)
*B60T 8/32* (2006.01)
*B60T 8/40* (2006.01)
*B60T 17/02* (2006.01)
(Continued)

(52) U.S. Cl.
CPC .............. *B60T 8/885* (2013.01); *B60T 8/3225* (2013.01); *B60T 8/4036* (2013.01); *B60T 8/404* (2013.01);
(Continued)

(58) Field of Classification Search
CPC ..... B60T 8/261; B60T 8/1706; B60T 8/1766; B60T 8/3225; B60T 8/50; B60T 8/5006; B60T 8/88; B60T 8/885; B60T 2270/414
USPC ............ 303/9.62, 9.64, 9.71, 122.04, 122.05, 303/137, 156, 157, 158, 199, 20
See application file for complete search history.

(56) References Cited

U.S. PATENT DOCUMENTS 5,244,257 A * 9/1993 Muller et al. .................. 303/137
6,092,879 A * 7/2000 Kornhaas et al. ........ 303/122.04
(Continued)

FOREIGN PATENT DOCUMENTS

JP    H07-17375    1/1995
JP    H07-304440    11/1995
(Continued)

OTHER PUBLICATIONS

Machine Translation of JP 07-304440 (no date).*
(Continued)

*Primary Examiner* — Nicholas J Lane
(74) *Attorney, Agent, or Firm* — Michael Best & Friedrich LLP

(57) ABSTRACT

A brake control device for a brake system. The control device can perform both an interlocking brake control and an antilock brake control. The brake system includes a front-wheel hydraulic circuit, a front-wheel-side braking part; a rear-wheel hydraulic circuit, a rear-wheel-side braking part; and an electrically-operated pump which pressurizes the brake fluid. The brake control device includes a usual voltage mode where the interlocking brake control or the anti-lock brake control is performed when the supply voltage is a first voltage or more, and a low voltage mode where at least one of the interlocking brake control and the anti-lock brake control is performed in a limited manner when the supplied voltage is a second, lower voltage. An operation mode is changed from the usual voltage mode to the low voltage mode when it is determined that the supply voltage becomes lower than the first voltage.

6 Claims, 5 Drawing Sheets

(51) Int. Cl.
  *B60T 17/22* (2006.01)
  *B60T 8/26* (2006.01)
  *B60T 13/14* (2006.01)
  *B60T 13/66* (2006.01)
  *B60T 13/68* (2006.01)
  *B60T 13/74* (2006.01)

(52) U.S. Cl.
  CPC ............... *B60T 8/4072* (2013.01); *B60T 17/02* (2013.01); *B60T 17/221* (2013.01); *B60T 2270/414* (2013.01); *B60T 8/261* (2013.01); *B60T 13/14* (2013.01); *B60T 13/146* (2013.01); *B60T 13/662* (2013.01); *B60T 13/686* (2013.01); *B60T 13/741* (2013.01)

(56) References Cited

U.S. PATENT DOCUMENTS

| | | | | |
|---|---|---|---|---|
| 6,102,492 A | * | 8/2000 | Diehle et al. | 303/113.5 |
| 6,793,295 B2 | * | 9/2004 | Sakamoto | 303/9.64 |
| 8,210,619 B2 | * | 7/2012 | Atsushi et al. | 303/9.64 |
| 8,633,611 B2 | * | 1/2014 | Waida et al. | 307/9.1 |
| 2010/0066160 A1 | * | 3/2010 | Atsushi et al. | 303/9.64 |
| 2011/0273005 A1 | * | 11/2011 | Westerfeld | 303/9.64 |

FOREIGN PATENT DOCUMENTS

| | | |
|---|---|---|
| JP | H08-34335 | 2/1996 |
| JP | 2000-71963 | 3/2000 |
| JP | 2003-25978 | 1/2003 |
| JP | 2004-268739 | 9/2004 |
| JP | 2005-206085 | 8/2005 |
| JP | 2005-212680 | 8/2005 |

OTHER PUBLICATIONS

PCT/JP2010/067941 International Search Report.

* cited by examiner (a) PRIOR ART (b)

(a)

(b)

BRAKE CONTROL DEVICE

BACKGROUND OF THE INVENTION

The present invention relates to a brake control device of a brake system which performs an interlocking brake control of a front-wheel-side brake and a rear-wheel-side brake, and an anti-lock brake control.

Conventionally, there has been known a brake control device of a brake system which performs an anti-lock brake control using an anti-lock brake system (ABS) by controlling a fluid pressure of a brake fluid supplied to a braking part by a hydraulic circuit. In this type of brake control device, a pressure of a brake fluid in the hydraulic circuit is increased by driving an electrically-operated pump provided to the hydraulic circuit. Usually, when a supply voltage supplied to the electrically-operated pump is lowered, discharge capacity of the electrically-operated pump is lowered. When a discharge amount of brake fluid from the electrically-operated pump cannot be maintained at an amount sufficient for performing an anti-lock brake control because of such lowering of discharge capacity of the electrically-operated pump, an overstep-in of a brake lever or a brake pedal takes place. Accordingly, an accumulator of the hydraulic circuit is filled with a brake fluid and hence, it becomes difficult to properly perform an anti-lock brake control. In view of the above, in the conventional brake control device, when a voltage value is lowered to a predetermined value or below, an anti-lock brake control is stopped.

Further, there has been proposed a front and rear wheel interlocking brake system (CBS) which automatically properly controls a balance between a braking force applied to a front wheel and a braking force applied to a rear wheel so as to take a proper balance between a braking force of a front-wheel-side brake and a braking force of a rear-wheel-side brake (see patent documents 1, 2 and 3, for example). This front and rear wheel interlocking brake system includes an ABS, and further includes a front-wheel-side brake circuit and a rear-wheel-side brake circuit, wherein both brake circuits are interlockingly operated in response to a brake operation of a user so that a balance between the braking force applied to the front wheel and the braking force applied to the rear wheel is automatically properly controlled.

RELATED ART DOCUMENTS

Patent Document 1: JP-A-2000-71963
Patent Document 2: JP-A-2005-212680
Patent Document 3: JP-A-2003-25978

SUMMARY OF THE INVENTION

However, in the brake control device of the above-mentioned prior art where an anti-lock brake control is stopped when a voltage is lowered, an electrically-operated pump cannot be operated at a low voltage. As a consequence, the voltage range where the electrically-operated pump is operable is narrow. Within this narrow voltage range, it is often the case that anti-lock brake control is stopped.

Further, the front and rear wheel interlocking brake system shares the hydraulic circuit and the electrically-operated pump with the anti-lock brake system so that a load applied to the electrically-operated pump is further increased. This creates a situation where it is inevitably necessary to stop anti-lock brake control is steadily increasing frequency.

It is an object of the present invention to provide a brake control device which can overcome the drawbacks of the above-mentioned prior art, and can perform both an interlocking brake control and an antilock brake control, and can perform the anti-lock brake control even when a voltage of electric power supplied to an electrically-operated pump is lowered.

In at least one embodiment, the invention provides a brake control device of a brake system which includes: a front-wheel hydraulic circuit which controls a fluid pressure of a brake fluid supplied to a front-wheel-side braking part; a rear-wheel hydraulic circuit which controls a fluid pressure of a brake fluid supplied to a rear-wheel-side braking part; and an electrically-operated pump which pressurizes the brake fluid, wherein the brake control device is capable of performing an interlocking brake control where, when braking is applied to one of the front-wheel-side braking part and the rear-wheel-side braking part, braking is also applied to the other breaking part in an interlocking manner with the one braking part. The brake control device is also capable of applying an anti-lock brake control to at least one of the front-wheel-side braking part and the rear-wheel-side braking part, wherein the brake control device includes a usual voltage mode where the interlocking brake control or the anti-lock brake control is performed when a voltage of electric power supplied to the brake control device is a first voltage or more, and a low voltage mode where at least one of the interlocking brake control and the anti-lock brake control is performed in a limited manner when the voltage of the electric power supplied to the brake control device is a second voltage which is lower than the first voltage or more, and an operation mode is changed over from the usual voltage mode to the low voltage mode when it is determined that the voltage of the electric power supplied to the brake control device becomes lower than the first voltage.

In this case, the anti-lock brake control may be performed such that an interval that a pressure of the brake fluid supplied to the front-wheel-side braking part or the rear-wheel-side braking part is intermittently increased is prolonged in the low voltage mode compared to the usual voltage mode. The anti-lock brake control may be performed such that a gradient that the pressure of the brake fluid supplied to the front-wheel-side braking part or the rear-wheel-side braking part is increased is made gentler in the low voltage mode compared to the usual voltage mode. The anti-lock brake control may be performed such that a maximum value of a braking force of the front-wheel-side braking part or the rear-wheel-side braking part in the low voltage mode becomes substantially equal to a maximum value of the braking force of the front-wheel-side braking part or the rear-wheel-side braking part in the usual voltage mode.

Also in this case, the interlocking brake control may be stopped in the low voltage mode. In the low voltage mode, the anti-lock brake control may be performed in the low voltage mode after the interlocking brake control is stopped. In changing over an operation mode from the usual voltage mode to the low voltage mode, when it is determined that at least one of the front-wheel-side braking part and the rear-wheel-side braking part is in the process of braking, the interlocking brake control may be maintained in the usual voltage mode until the brake operation is finished.

When the operation mode is changed over to the low voltage mode, the low voltage mode may be maintained until the supply of electric power to the front-wheel hydraulic circuit, the rear-wheel hydraulic circuit and the electrically-operated pump is stopped.

According to certain embodiments of the invention, anti-lock brake control can be performed even when a voltage of electric power supplied to the electrically-operated pump is lowered. And, this control can be performed while also performing interlocking brake control.

DETAILED DESCRIPTION

Hereinafter, a preferred embodiment of the invention is explained in conjunction with drawings.

Figure 1:
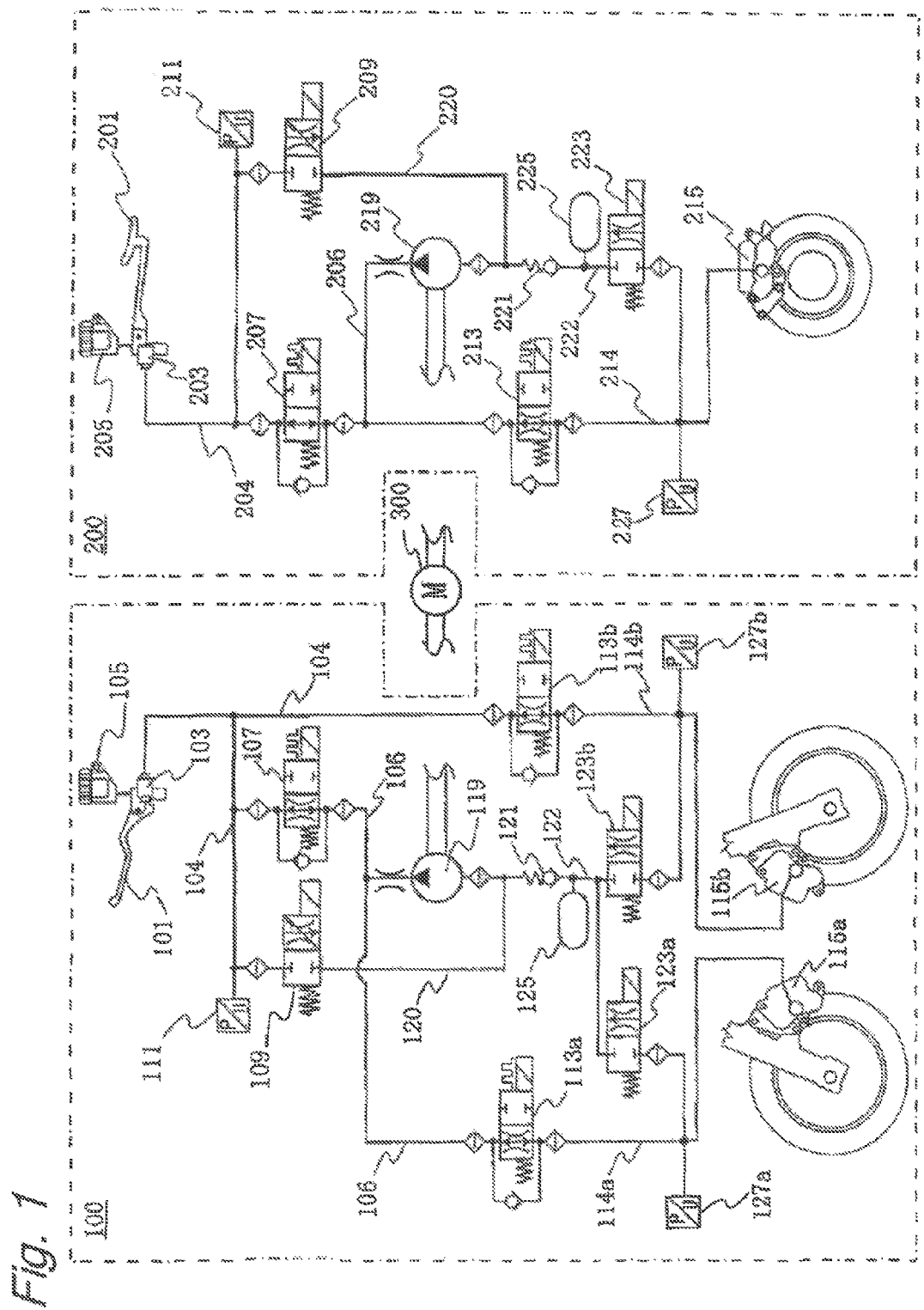
FIG. 1 is a circuit diagram showing a hydraulic circuit according to one embodiment of the invention.

FIG. 1 shows a hydraulic circuit of a brake system of this embodiment. This brake system is constituted of a front wheel hydraulic circuit 100, a rear wheel hydraulic circuit 200, and a DC motor 300 which drives hydraulic pumps of the front wheel hydraulic circuit 100 and the rear wheel hydraulic circuit 200 respectively. The hydraulic circuit is filled with a brake fluid. In this embodiment, the electrically-operated pump is constituted of a front-wheel-side hydraulic pump 119, a rear-wheel-side hydraulic pump 219 and the DC motor 300.

Firstly, the architecture of the front wheel hydraulic circuit 100 is explained. The front wheel hydraulic circuit 100 includes a brake lever 101 which a rider manipulates with his right hand, a front-wheel-side master cylinder 103 which is pressurized when the brake lever 101 is manipulated, a reservoir 105 for the front-wheel-side master cylinder which is connected to the front-wheel-side master cylinder 103, a front-wheel-side selector valve 107 which is connected to the front-wheel-side master cylinder 103 by way of a pipe line 104, and a front-wheel-side suction valve 109 which is connected to the front-wheel-side master cylinder 103 by way of the pipe line 104. Filters are provided to a connection portion between the pipe line 104 and the front-wheel-side selector valve 107 and to a connection portion between the pipe line 104 and the front-wheel-side suction valve 109 respectively. Further, a pressure sensor 111 is provided to the pipe line 104. The pressure sensor 111 detects a pressure in the pipe line between the front-wheel-side master cylinder 103 and the front-wheel-side selector valve 107 and a pressure between the front-wheel-side master cylinder 103 and the front-wheel-side suction valve 109, and transmits detected pressures to an ECU (brake control device) 400 which is an electronic control unit described later.

Further, a front-wheel-side first charge valve 113a is connected to the front-wheel-side selector valve 107 by way of a pipe line 106. Filters are also provided to a connection portion between the front-wheel-side selector valve 107 and the pipe line 106 and to a connection portion between the front-wheel-side first charge valve 113a and the pipe line 106 respectively. The front-wheel-side first charge valve 113a is connected to a front-wheel-side first caliper 115a (front-wheel-side braking part) by way of a pipe line 114a.

On the other hand, a front-wheel-side second charge valve 113b is directly connected to the pipe line 104. A filter is also provided to a connection portion between the front-wheel-side second charge valve 113b and the pipe line 104. The front-wheel-side second charge valve 113b is connected to a front-wheel-side second caliper 115b (front-wheel-side braking part) by way of a pipe line 114b.

The brake system of the present invention is connected to a front wheel brake which is operated by the front wheel hydraulic circuit 100. The front wheel brake is constituted of a front-wheel first brake including the front-wheel-side first caliper 115a and a front-wheel second brake including the front-wheel-side second caliper 115b.

The front-wheel-side first caliper 115a is connected to the front-wheel-side first charge valve 113a by way of the pipe line 114a as described above. The front-wheel-side second caliper 115b is connected to the front-wheel-side second charge valve 113b by way of the pipe line 114b as described above.

On the other hand, a discharge side of the front-wheel-side hydraulic pump 119 is connected to the pipe line 106 by way of a throttle. A suction side of the front-wheel-side hydraulic pump 119 is connected to a pipe line 120 by way of a filter. The front-wheel-side hydraulic pump 119 is driven by the DC motor 300. One end of a front-wheel-side first check valve 121 is connected to the pipe line 120. A discharge port of the front-wheel-side suction valve 109 is connected to the pipe line 120. Further, the other end of the front-wheel-side first check valve 121 is connected to a pipe line 122. The front-wheel-side first check valve 121 is arranged so as to prevent backflow from the pipe line 120 toward the pipe line 122.

Discharge ports of front-wheel-side release valves 123a, 123B are connected to the pipe line 122. Further, a front-wheel-side accumulator 225 is connected to the pipe line 122 between the front-wheel-side check valve 121 and the front-wheel-side release valves 123a, 123B.

An inlet end of the front-wheel-side first release valve 123a is connected to the front-wheel-side first caliper 115a by way of the pipe line 114a. An outlet port of the front-wheel-side first release valve 123a is connected to the pipe line 122. Further, a filter is provided to a connection portion between the inlet port of the front-wheel-side first release valve 123a and the pipe line 114a. A pressure sensor 127a is provided to the pipe line 114a. The pressure sensor 127a measures a pressure in the pipe line 114a and transmits a pressure signal to the ECU 400.

Further, an inlet port of the front-wheel-side second release valve 123b is connected to the front-wheel-side second caliper 115b by way of the pipe line 114b. An outlet port of the front-wheel-side second release valve 123b is connected to the pipe line 122. Further, a filter is provided to a connection portion between the inlet port of the front-wheel-side second release valve 123b and the pipe line 114b. A pressure sensor 127b is provided to the pipe line 114b. The pressure sensor 127b measures a pressure in the pipe line 114b and transmits a pressure signal to the ECU 400. The pressure in the pipe line 114b does not become higher than a pressure in the pipe line 114a and the pressure in the pipe line 114a is detected by the pressure sensor 127a and hence, the pressure sensor 127b can be omitted.

Next, the constitution of the rear wheel hydraulic circuit 200 is explained in conjunction with FIG. 1. The rear wheel hydraulic circuit 200 includes a brake pedal 201 which the rider manipulates with his right foot, a rear-wheel-side master cylinder 203 which is pressurized when the brake pedal 201 is manipulated, a reservoir 205 for the rear-wheel-side master cylinder which is connected to the rear-wheel-side master cylinder 203, a rear-wheel-side selector valve 207 which is connected to the rear-wheel-side master cylinder 203 by way of a pipe line 204, and a rear-wheel-side suction valve 209 which is connected to the rear-wheel-side master cylinder 203 by way of the pipe line 204. Filters are provided to a connection portion between the pipe line 204 and the rear-wheel-side selector valve 207 and to a connection portion between the pipe line 204 and the rear-wheel-side suction valve 209 respectively. Further, a pressure sensor 211 is provided to the pipe line 204. The pressure sensor 211 detects a pressure in the pipe line between the rear-wheel-side master cylinder 203 and the rear-wheel-side selector valve 207 and a pressure in the pipe line between the rear-wheel-side master cylinder 203 and the rear-wheel-side suction valve 209, and transmits the pressures to the ECU 400.

Further, a rear-wheel-side charge valve 213 is connected to the rear-wheel-side selector valve 207 by way of a pipe line 206. Filters are also provided to a connection portion between the rear-wheel-side selector valve 207 and the pipe line 206 and to a connection portion between the rear-wheel-side charge valve 213 and the pipe line 206 respectively. The rear-wheel-side charge valve 213 is connected to a rear-wheel-side caliper 215 (rear-wheel-side braking part) by way of a pipe line 214. A rear wheel brake is constituted of the rear-wheel-side caliper 215. Further, the rear-wheel-side caliper 215 is connected to the rear-wheel-side charge valve 213 by way of the pipe line 214 as described above.

On the other hand, a discharge side of the rear-wheel-side hydraulic pump 219 is connected to the pipe line 206 by way of a throttle. A suction side of the rear-wheel-side hydraulic pump 219 is connected to a pipe line 220 by way of a filter. The rear-wheel-side hydraulic pump 219 is driven by the DC motor 300. One end of a rear-wheel-side check valve 221 is connected to the pipe line 220. A discharge port of the rear-wheel-side suction valve 209 is connected to the pipe line 220. The other end of the rear-wheel-side check valve 221 is connected to a pipe line 222. The rear-wheel-side check valve 221 is arranged so as to prevent a backflow from the pipe line 220 toward the pipe line 222.

A discharge port of a rear-wheel-side release valve 223 is connected to the pipe line 222. Further, the rear-wheel-side accumulator 225 is connected to the pipe line 222 between the rear-wheel-side check valve 221 and the rear-wheel-side release valve 223.

The rear-wheel-side caliper 215 is connected to an inlet port of the rear-wheel-side release valve 223 by way of the pipe line 214. An outlet port of the rear-wheel-side release valve 223 is connected to the pipe line 222. Further, a filter is provided to a connection portion between the outlet port of the rear-wheel-side release valve 223 and the pipe line 214. A pressure sensor 227 is provided to the pipe line 214, and the pressure sensor 227 measures a pressure in the pipe line 214 and transmits a pressure signal to the ECU 400.

Figure 2:
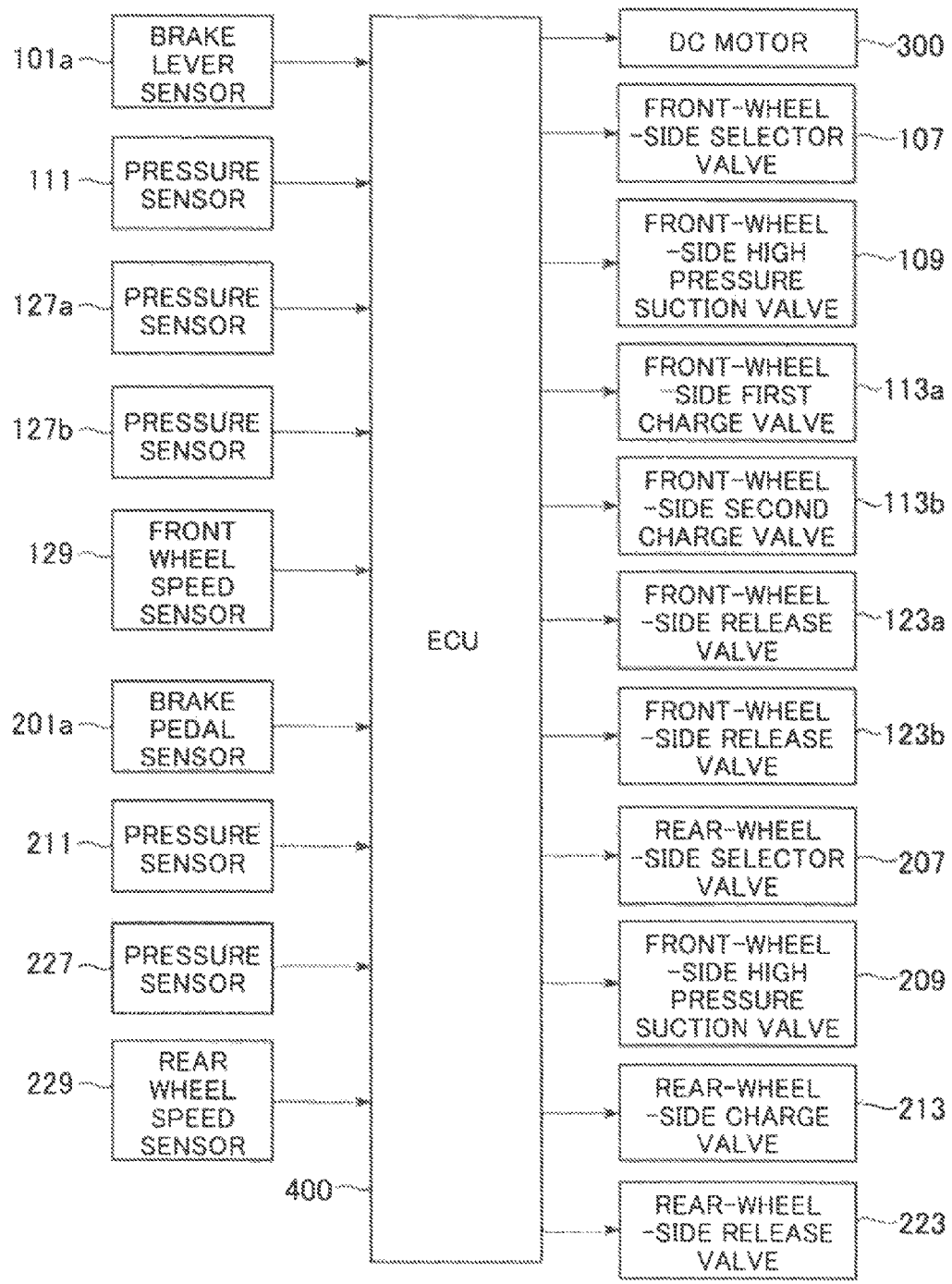
FIG. 2 is a block diagram showing the an ECU that controls the hydraulic circuit of FIG. 1 along with associated input and output devices.

The hydraulic circuit shown in FIG. 1 is controlled by the ECU 400 which is the electronic control unit shown in a block diagram of FIG. 2. A brake lever sensor 101a which is mounted on the brake lever 101, the pressure sensors 111, 127a, 127b and a front wheel speed sensor 129 which detects a front-wheel rotational speed are connected to the ECU 400. The brake lever sensor 101a transmits the manipulation of the brake lever 101 to the ECU 400 as a signal, the pressure sensors 111, 127a, 127b transmit respective pressures in the respective pipe lines 104, 114a, 114b to the ECU 400 respectively as signals, and the front wheel speed sensor 129 transmits a rotational speed of the front wheel to the ECU 400 as a signal. Further, a brake pedal sensor 201a which is mounted on the brake pedal 201, the pressure sensors 211, 227 and a rear wheel speed sensor 229 which detects rear-wheel rotational speed are connected to the ECU 400. The brake pedal sensor 201 transmits the manipulation of the brake pedal 201 to the ECU 400 as a signal, the pressure sensors 211, 227 transmit respective pressures in the respective pipe lines 204, 214 to the ECU 400 as signals, and the rear wheel speed sensor 229 transmits a rotational speed of the rear wheel to the ECU 400 as a signal.

Further, the ECU 400 operates the DC motor 300, the front-wheel-side selector valve 107, the front-wheel-side suction valve 109, the front-wheel-side first charge valve 113a, the front-wheel-side second charge valve 113b, the front-wheel-side first release valve 123a, and the front-wheel-side second release valve 123b respectively in response to manipulation signals, pressure signals and speed signals in accordance with predetermined conditions. Further, the ECU 400 operates the rear-wheel-side selector valve 207, the rear-wheel-side suction valve 209, the rear-wheel-side charge valve 213, and the rear-wheel-side release valve 223 respectively in response to manipulation signals, pressure signals and speed signals in accordance with predetermined conditions. Here, the respective valves are formed of an electromagnetic valve provided with a solenoid, and an open/close state of each valve is changed over with the supply of electric power which is controlled by the ECU 400.

Further, at the time of applying braking, when the ECU 400 receives a rotational speed signal from the front-wheel speed sensor 129 or the rear-wheel speed sensor 229 and detects that the wheel is locked, the ECU 400 operates an antilock brake system (ABS) thus operating the respective hydraulic pumps and opening/closing the respective valves whereby a braking force is controlled thus preventing the wheel from being locked.

The manner of operation of the hydraulic circuit according to this embodiment is explained in conjunction with a usual brake state and an interlocking brake operation state. Open/close states of the respective valves shown in FIG. 1 are states where a usual brake is operable.

Firstly, the explanation is made with respect to a case where the brake lever 101 and the brake pedal 201 are simultaneously operated in a usual brake state. In the front-wheel hydraulic circuit 100, due to an operation of the brake lever 101, the front-wheel-side master cylinder 103 is operated so that a fluid pressure in the pipe line 104 is elevated. Since the front-wheel-side selector valve 107, the front-wheel-side first charge valve 113a and the front-wheel-side second charge valve 113b are in an open state shown in FIG. 1, a fluid pressure in the pipe line 104 is applied to the front-wheel-side first caliper 115a and the front-wheel-side second caliper 115b through the front-wheel-side selector valve 107, the pipe line 106, the front-wheel-side first charge valve 113a and the front-wheel-side second charge valve 113b, the pipe line 114a and the pipe line 114b so that the front-wheel-side first caliper 115a and the front-wheel-side second caliper 115b are operated whereby braking is applied to the front wheel by the front wheel brake.

In the same manner, in the rear-wheel hydraulic circuit 200, due to an operation of the brake pedal 201, the rear-wheel-side master cylinder 203 is operated so that a fluid pressure in the pipe line 204 is elevated. Since the rear-wheel-side selector valve 207 and the rear-wheel-side charge valve 213 are in an open state shown in FIG. 1, a fluid pressure in the pipe line 204 is applied to the rear-wheel-side caliper 215 through the rear-wheel-side selector valve 207, the pipe line 206, the rear-wheel-side charge valve 213 and the pipe line 214 so that the rear-wheel-side caliper 215 is operated whereby braking is applied to the rear wheel by the rear wheel brake.

On the other hand, a front and rear wheel interlocking brake control in an interlocking brake operating state is performed as follows. Firstly, in the front-wheel active pressure increase interlocked with a rear-wheel brake input pressure, a front-wheel initial adding target pressure relevant to the rear-wheel brake input pressure is decided. Then, the front-wheel initial adding target pressure is modified based on a vehicle body speed or the like thus deciding a front-wheel modified adding target pressure. Using the front-wheel modified adding target pressure as a front-wheel pump-up pressure, the pressure in the front-wheel brake is increased. Secondly, in the rear-wheel active pressure increase interlocked with a front-wheel brake input pressure, a rear-wheel initial adding target pressure relevant to the front-wheel brake input pressure is decided. Then, the rear-wheel initial adding target pressure is modified based on a vehicle body speed or the like thus deciding a rear-wheel modified adding target pressure. When the rear-wheel modified adding target pressure is larger than the rear-wheel brake pressure, the pressure of the rear-wheel brake is increased in accordance with the rear-wheel modified adding target pressure.

Figure 3:
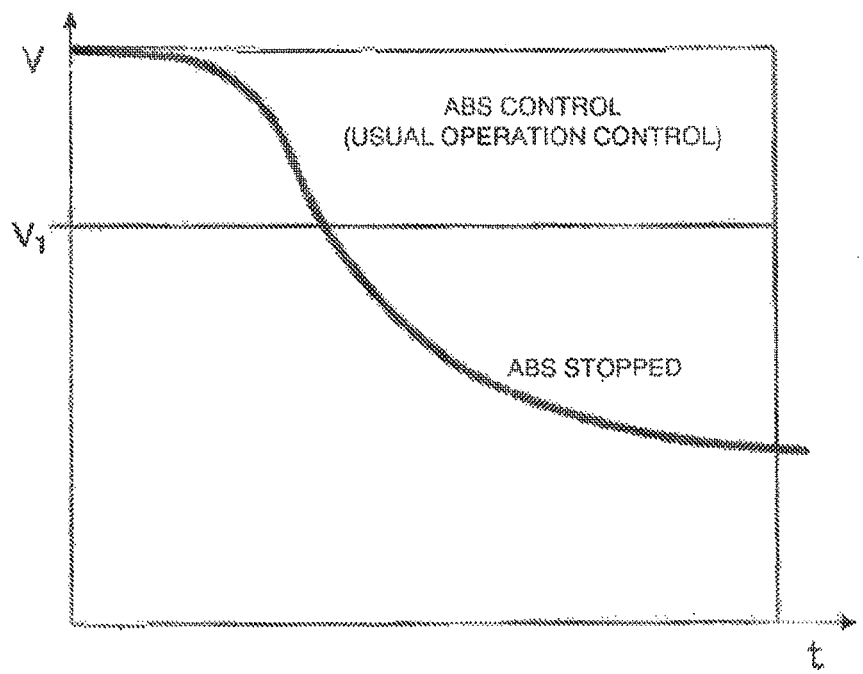
FIG. 3(a) is a view showing a mode of an anti-lock brake control using a conventional ECU.
FIG. 3(b) is a view showing a mode of an anti-lock brake control using an ECU according to an embodiment of the present invention.
Figure 3:
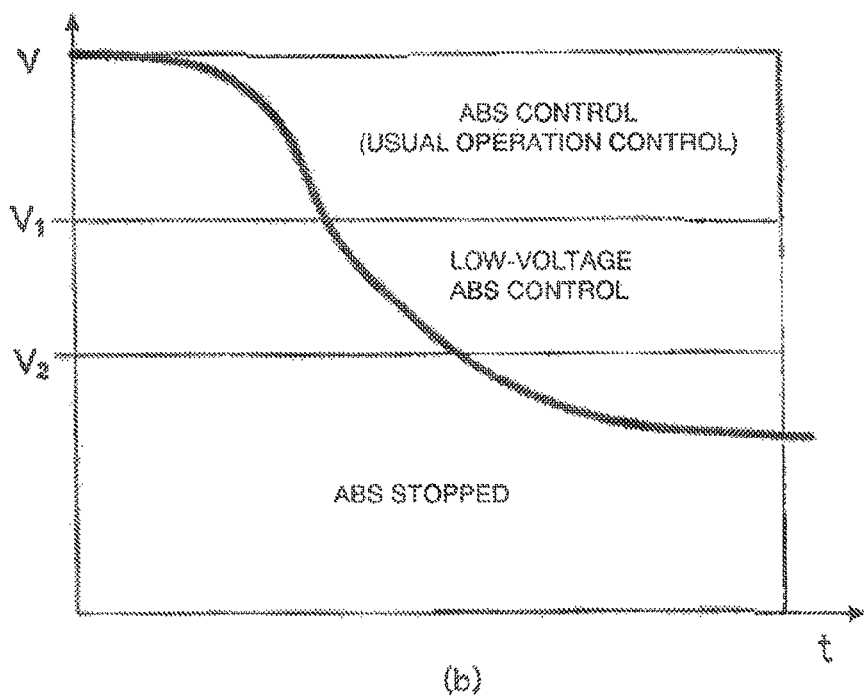

FIG. 3 illustrates modes of an anti-lock brake control that can be achieved using an ECU. FIG. 3($a$) is a view showing a mode of an anti-lock brake control using a conventional ECU, and FIG. 3($b$) is a view showing a mode of an anti-lock brake control using the ECU according to an embodiment of the invention. In FIG. 3($a$) and FIG. 3($b$), a voltage supplied from a battery (which constitutes a power source) is taken on an axis of ordinates, and a lapsed time is taken on an axis of abscissas.

In the conventional ECU, when a voltage value of a voltage supplied to a DC motor of an electrically-operated pump is lowered to a voltage V1 or below, a discharge amount of the brake fluid from the pump is lowered so that an anti-lock brake control cannot be continued. As a consequence, anti-lock brake control is stopped.

To the contrary, in the ECU 400 according to this embodiment, firstly, an anti-lock brake control is performed in a usual voltage mode until a voltage value of a voltage supplied to the ECU 400 assumes the voltage V1 (first voltage). Next, when the voltage value of a voltage supplied to the ECU 400 is lowered to a voltage lower than the voltage V1, the ECU 400 is changed over to a low voltage mode where the anti-lock brake control can be performed even at a voltage lower than a voltage V1 thus performing the anti-lock brake control in the low voltage mode. When a voltage value of a supplied voltage is lowered to a voltage lower than a voltage V2 (second voltage), the ECU 400 stops the anti-lock brake control. When an output of a battery is lowered, both electric power supplied to the ECU 400 and electric power supplied to the DC motor 300 are lowered. This is because when a voltage value of a voltage supplied to the ECU 400 is lower than V2, a voltage value of electric power supplied to the DC motor 300 is also low so that a discharge amount of the brake fluid from the electrically-operated pump cannot be maintained at a discharge amount of the brake fluid sufficient for performing an anti-lock brake control.

Figure 4:
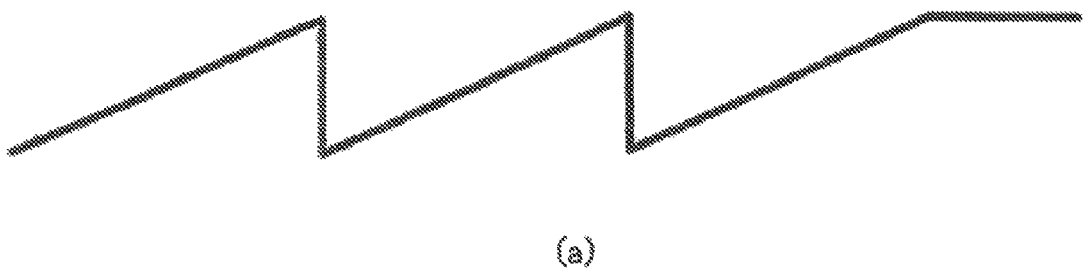
FIG. 4(a) is a schematic view showing a change in a braking force in a usual voltage mode.
FIG. 4(b) is a schematic view showing a change in a braking force in a low voltage mode.
Figure 4:
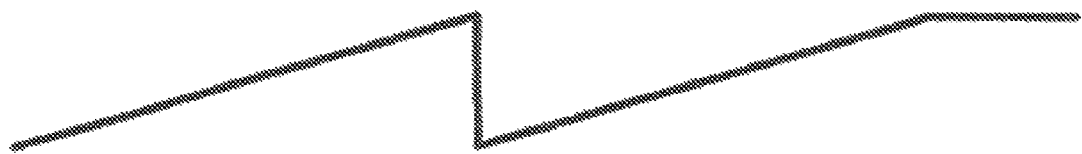

FIG. 4 is a view showing a mode of an anti-lock brake control using the ECU in a usual voltage mode and a low voltage mode. FIG. 4($a$) is a schematic view showing a change in a braking force in the usual voltage mode, and FIG. 4($b$) is a schematic view showing the change in a braking force in a low voltage mode. In FIG. 4($a$) and FIG. 4($b$), a magnitude of a braking force is taken on an axis of ordinates, and a lapsed time is taken on an axis of abscissas.

As shown in FIG. 4($a$), in performing an anti-lock brake control in a usual voltage mode, the ECU 400 intermittently and finely applies braking to the braking part consisting of the front-wheel-side first caliper 115$a$, the front-wheel-side second caliper 115$b$, the rear-wheel-side caliper 215 and the like at short intervals. Accordingly, the ECU 400 can follow a change in a road surface state with higher accuracy and, hence, a traveling distance or a traveling time which a vehicle requires for deceleration can be shortened.

On the other hand, as shown in FIG. 4($b$), in performing an anti-lock brake control in a low voltage mode, the ECU 400 prolongs a cycle at which braking is applied by performing an anti-lock brake control such that an interval at which a pressure of a brake fluid supplied to braking parts 115$a$, 115$b$, 215 is intermittently increased becomes longer than a corresponding interval in a usual voltage mode. Here, the ECU 400 applies braking to the braking parts 115$a$, 115$b$, 215 with a braking force of a maximum value substantially equal to a braking force of the maximum value in a usual voltage mode and hence, the low voltage mode differs from the usual voltage mode only with respect to the road surface followability.

Although a braking force applied in a low voltage mode is substantially equal to a braking force applied in a usual voltage mode, an interval at which braking is applied to the braking parts 115$a$, 115$b$, 215 is prolonged in the low voltage mode. Accordingly, the ECU 400 makes the low voltage mode differ from the usual mode in the degree at which a fluid pressure of a brake fluid supplied to the braking parts 115$a$, 115$b$, 215 is increased, that is, the pressure increase gradient. The pressure increase gradient in the low voltage mode is set lower than the pressure increase gradient in the usual voltage mode. That is, the pressure increase gradient in the low voltage mode is set gentler than the pressure increase gradient in the usual voltage mode. Accordingly, in the low voltage mode, an amount of brake fluid released to the accumulators 125, 225 when a fluid pressure of a brake fluid at the time of performing an anti-lock brake control is reduced becomes smaller than an amount of a corresponding brake fluid in the usual voltage mode. As a result, discharge amounts of the brake fluid from the hydraulic pumps 119, 219 required for discharging brake fluids stored in the accumulators 125, 225 can be decreased and hence, the ECU 400 can properly perform an anti-lock brake control even at the time of operating the hydraulic pumps 119, 219 at a low voltage.

Figure 5:
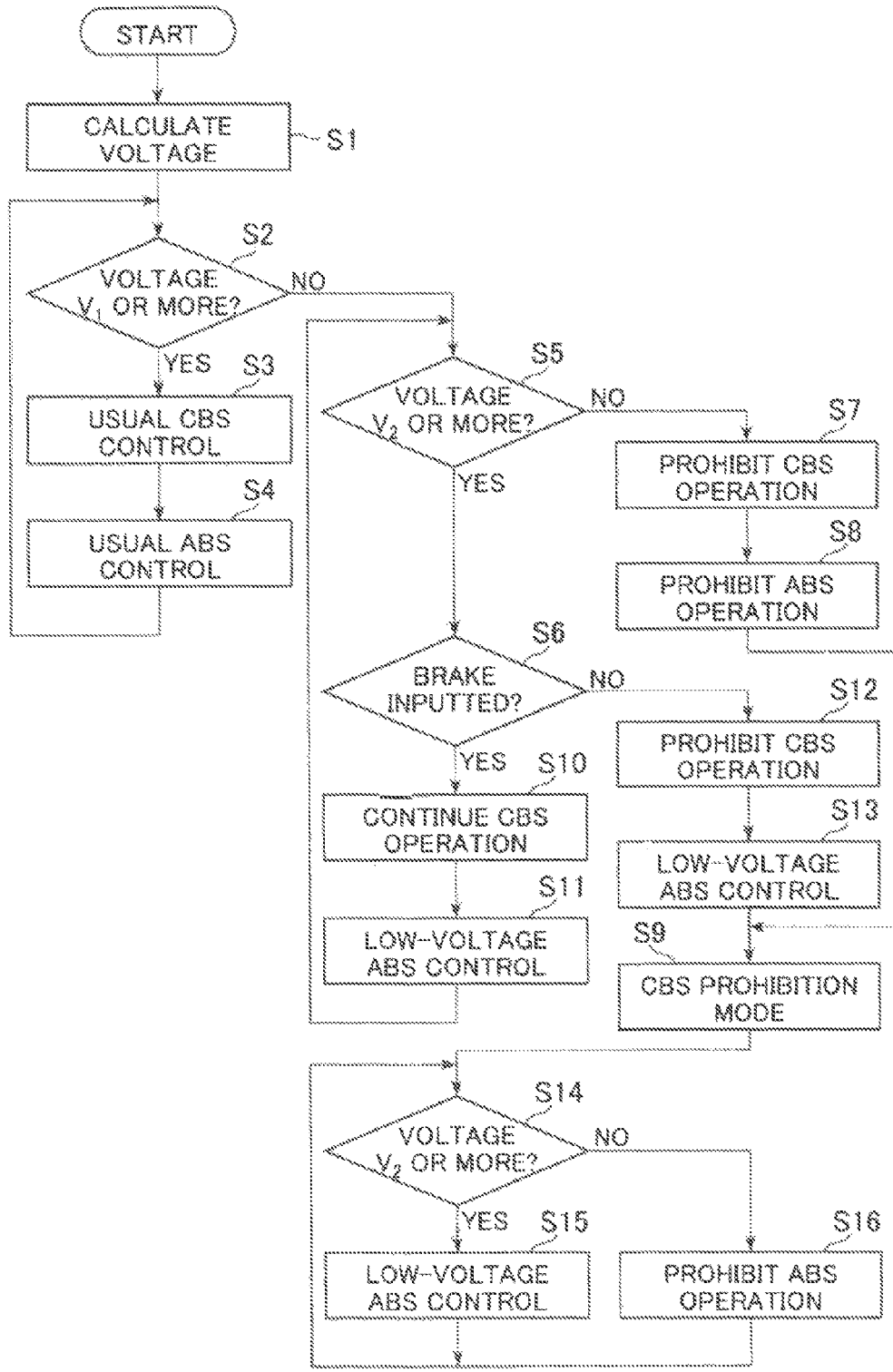
FIG. 5 is a flowchart showing an operation when the ECU performs mode switching processing corresponding to a voltage.

FIG. 5 is a flowchart showing an operation when the ECU performs mode switching processing corresponding to a voltage.

In performing mode switching processing corresponding to a supplied voltage, firstly, the ECU 400 calculates a voltage of electric power supplied to the ECU 400 (step S1). In this embodiment, a power source voltage of a battery which constitutes a power source is monitored based on electric power supplied to the ECU 400, and a voltage of electric power supplied to the DC motor 300 is determined based on the power source voltage. Here, the ECU 400 operates the anti-lock brake system (ABS) and the front and rear wheel interlocking brake system (CBS) in a usual voltage mode.

Next, the ECU 400 determines whether or not the voltage calculated by arithmetic operation is V1 or more (step S2). Here, for example, it may be determined that the voltage is not V1 or more only when the voltage is not V1 or more over a predetermined time such as 1 second.

When the ECU 400 determines that the voltage calculated by arithmetic operation is V1 or more in step S2 (step S2: Yes), the ECU 400 continues an operation of the front and rear wheel interlocking brake system based on a usual interlocking brake control (step S3). Next, the ECU 400 maintains an anti-lock brake control in a usual voltage mode (step S4). When the ECU 400 performs processing in step S4, the ECU 400 repeats a series of processing starting from step S1.

On the other hand, when the ECU 400 determines that the voltage calculated by arithmetic operation is not V1 or more in step S2 (step S2: No), the ECU 400 determines whether or not the voltage calculated by arithmetic operation is V2 or more (step S5). Here, for example, it may be determined that the voltage is not V2 or more only when the voltage is not V2 or more over a predetermined time such as 1 second.

When the ECU 400 determines that the voltage calculated by arithmetic operation is V2 or more in step S5 (step S5: Yes), the ECU 400 advances to processing in step S6.

On the other hand, when the ECU 400 determines that the voltage calculated by arithmetic operation is not V2 or more in step S5 (step S5: No), the ECU 400 prohibits an operation of the front and rear wheel interlocking brake system (step S7) thus prohibiting an operation of the anti-lock brake system (step S8). Here, the ECU 400 turns on an ABS alarm lamp arranged at a position where a user can visually recognize the ABS alarm lamp thus displaying the fact that an operation of the anti-lock brake system is stopped. When the ECU 400 performs processing in step S8, the ECU 400 is changed over to a CBS prohibition mode which is a low voltage mode (step S9), and the ECU 400 stops the front and rear wheel interlocking brake system.

When the ECU 400 advances to processing in step S6, the ECU 400 determines whether or not inputting of a brake is present (step S6). Here, inputting of a brake means inputting which is generated when a user manipulates the brake lever 101 or the brake pedal 201. That is, in step S6, the ECU 400 determines whether or not the user applies braking to the braking parts 115*a*, 115*b*, 215 by manipulating the brake lever 101 or the brake pedal 201.

When the ECU 400 determines that inputting of a brake is present in step S6 (step S6: Yes), the ECU 400 continues an operation of the front and rear wheel interlocking brake system (step S10), and performs an anti-lock brake control in a low voltage mode (step S11). When the ECU 400 performs processing in step S11, the ECU 400 repeats a series of processing starting from step S5. That is, the ECU 400, when the ECU 400 determines that the voltage is V2 or more, repeats processing in step S10 and step S11 until a brake release is established.

On the other hand, when the ECU 400 determines that inputting of a brake is not present in step S6 (step S6: No), the ECU 400 is changed over to a low voltage mode so that the ECU 400 prohibits the operation of the front and rear wheel interlocking brake system (step S12). Next, the ECU 400 performs an anti-lock brake control in the low voltage mode by adjusting a pressure increase gradient for increasing a fluid pressure of a brake fluid based on the calculation result (step S13). Here, the ECU 400 flickers an ABS alarm lamp arranged at a position where the user can visually recognize the ABS alarm lamp thus displaying the fact that the anti-lock brake control is performed in the low voltage mode. When the ECU 400 performs processing in step S13, the ECU 400 is changed over to a CBS prohibition mode which is a low voltage mode (step S9), and the ECU 400 stops the front and rear wheel interlocking brake system.

When the ECU 400 advances to processing in step S14, the ECU 400 determines whether or not the voltage calculated by arithmetic operation is V2 or more (step S14).

When the ECU 400 determines that the voltage calculated by arithmetic operation is V2 or more in step S14 (step S14: Yes), the ECU 400 performs an anti-lock brake control in a low voltage mode (step S15). When the ECU 400 performs processing in step S15, the ECU 400 repeats a series of processing starting from step S14.

On the other hand, when the ECU 400 determines that the voltage calculated by arithmetic operation is not V2 or more in step S14 (step S14: No), the ECU 400 prohibits an operation of the anti-lock brake system (step S16). When the ECU 400 performs processing in step S16, the ECU 400 repeats a series of processing starting from step S14. That is, once the ECU 400 is changed over to the low voltage mode, the ECU 400 maintains the low voltage mode until ignition is turned off so that the supply of electric power to the front wheel hydraulic circuit 100, the rear wheel hydraulic circuit 200, and the DC motor 300 of the electrically-operated pump is stopped.

As can be understood from the above-mentioned processing, when a voltage of electric power supplied to the ECU 400 is V1 or more, the ECU 400 is in a usual voltage mode, and the ECU 400 performs an anti-lock brake control in a usual voltage mode, and operates the front and rear wheel interlocking brake system.

On the other hand, when a voltage of electric power supplied to the ECU 400 is V2 or more and below V1 and brake release is performed, the ECU 400 is changed over to a low voltage mode corresponding to a condition that the voltage is V2 or more and below V1, and the ECU 400 performs an anti-lock brake control in the low voltage mode, and stops the front and rear wheel interlocking brake system. Here, when the brake release is not performed, the ECU 400 is changed over to the low voltage mode only with respect to the anti-lock brake control and the ECU 400 performs the anti-lock brake control in the low voltage mode, while the ECU 400 continues the operation of the front and rear wheel locking brake system until the brake release is established.

Further, when the voltage of the electric power supplied to the ECU 400 is lower than V2, the ECU 400 stops the anti-lock brake control, and stops the front and rear wheel interlocking brake system. That is, the ECU 400 is changed over to the low voltage mode corresponding to a condition that the voltage is lower than V2.

In this embodiment, the ECU 400 includes a usual voltage mode where the interlocking brake control or the anti-lock brake control is performed when a voltage of the electric power supplied to the ECU 400 is a voltage V1 or more, and a low voltage mode where at least one of the interlocking brake control and the anti-lock brake control is performed in a limited manner when the voltage of the electric power supplied to the ECU 400 is a voltage V2 which is lower than the voltage V1 or more, and when the ECU 400 determines that a voltage of electric power supplied to the ECU 400 becomes lower than the voltage V1, the ECU 400 is changed over from the usual voltage mode to the low voltage mode where pressure increase cycle is prolonged by gradually decreasing a pressure increase gradient of a fluid pressure of a brake fluid. Accordingly, the ECU 400, even during a low voltage operation, can prevent a discharge amount of the brake fluid from the electrically-operated pump from becoming smaller than a discharge amount of the brake fluid required for an anti-lock brake control in braking the braking parts 115*a*, 115*b*, 215 at the time of performing the anti-lock brake control. As a result, the ECU 400 can continue the anti-lock brake control even when a voltage of electric power supplied to the DC motor 30 of the electrically-operated pump is lowered thus broadening an operation area of the anti-lock brake system.

Also in this embodiment, in the ECU 400, maximum values of braking forces of the braking parts 115*a*, 115*b*, 215 in a low voltage mode are set substantially equal to maximum values of braking forces of the braking parts 115a, 115b, 215 in a usual voltage mode. Accordingly, although followability for a change in a road surface state is lowered, the ECU 400 can maintain the deceleration of a vehicle generated by a braking force at the time of performing an anti-lock brake control at the substantially same level as the deceleration of the vehicle in a usual voltage mode.

Further, in this embodiment, it is unnecessary to provide an additional device or the like for changing over an operation mode from a usual voltage mode to a low voltage mode, and it is possible to broaden an operation area of the anti-lock brake system when a voltage is lowered with the constitution which requires the small number of items which require confirmation processing at the time of mode switching. Further, it is unnecessary to change a threshold value of a slip ratio of a wheel used in determining whether or not an anti-lock brake control is to be performed or a pressure reducing amount at the time of reducing a pressure of a brake fluid in performing an anti-lock brake control and hence, the lowering of deceleration of a vehicle can be decreased.

Although the present invention has been explained in conjunction with the embodiment heretofore, the present invention is not limited to such an embodiment. For example, in the above-mentioned embodiment, the ECU 400 is mounted on a motorcycle. However, the present invention is not limited to such a case. Provided that a vehicle on which the ECU 400 is mounted is a vehicle where an anti-lock brake control is influenced by lowering of a voltage of electric power supplied to a DC motor of an electrically-operated pump, the vehicle may be an automobile or the like.

Further, in the above-mentioned embodiment, a power source voltage of the battery which constitutes the power source is monitored, and lowering of a voltage of electric power supplied to the DC motor 300 is determined based on the monitored power source voltage. However, the present invention is not limited to such determination. For example, voltage lowering may be determined by directly detecting a voltage of electric power supplied to the DC motor of an electrically-operated pump or by estimating lowering of a voltage based on electric power or the like detected at other portions provided that lowering of voltage of electric power supplied to the DC motor 300 can be determined. Further, lowering of a voltage may be determined such that a fluid pressure on a discharge side of the electrically-operated pump is detected by a pressure sensor, and it is determined that a voltage of electric power supplied to the DC motor is lowered based on the detected fluid pressure or based on the detected fluid pressure and a power source voltage.

DESCRIPTION OF REFERENCE NUMERALS AND SIGNS

100: front wheel hydraulic circuit
101: brake lever
103: front-wheel-side master cylinder
107: front-wheel-side selector valve
109: front-wheel-side suction valve
113a: front-wheel-side first charge valve
113b: front-wheel-side second charge valve
115a: front-wheel-side first caliper (front-wheel-side braking part)
115b: front-wheel-side second caliper (front-wheel-side braking part)
119: front-wheel-side hydraulic pump
121: front-wheel-side first check valve
125: front-wheel-side accumulator
116: front-wheel-side second check valve
130: front-wheel-side third check valve
132: front-wheel-side fourth check valve
134: front-wheel-side fifth check valve
200: rear wheel hydraulic circuit
201: brake pedal
203: rear-wheel-side master cylinder
207: rear-wheel-side selector valve
209: rear-wheel-side suction valve
213: rear-wheel-side charge valve
215: rear-wheel-side caliper (rear-wheel-side braking part)
219: rear-wheel-side hydraulic pump
221: rear-wheel-side check valve
225: rear-wheel-side accumulator
300: DC motor
400: ECU (brake control device)

The invention claimed is:

1. A brake control device for a brake system comprising a front-wheel hydraulic circuit which controls a fluid pressure of a brake fluid supplied to a front-wheel-side braking part; a rear-wheel hydraulic circuit which controls a fluid pressure of a brake fluid supplied to a rear-wheel-side braking part; and an electrically-operated pump which pressurizes the brake fluid of at least one of the front-wheel hydraulic circuit and the rear-wheel hydraulic circuit,
   wherein the brake control device is configured to perform an interlocking brake control, the interlocking brake control comprising a control wherein when braking is applied to a first one of the front-wheel-side braking part and the rear-wheel-side braking part via a user input, braking is applied to a second one of the front-wheel-side braking part and the rear-wheel-side braking part via the electrically operated pump, wherein the braking applied to the second one is at least partially dependent on the braking applied to the first one, and wherein the control device is configured to apply an anti-lock brake control to at least one of the front-wheel-side braking part and the rear-wheel-side braking part,
   wherein the brake control device includes a usual voltage mode where the interlocking brake control and the anti-lock brake control are performed when a voltage of electric power supplied to the brake control device is greater than or equal to a first voltage, and a low voltage mode wherein the interlocking brake control is stopped and the anti-lock brake control is performed so that an interval of an intermittent pressure increase of the brake fluid supplied to the first one of the front-wheel-side braking part or the rear-wheel-side braking part is prolonged compared to the usual voltage mode when the voltage of the electric power supplied to the brake control device is greater than or equal to a second voltage and less than the first voltage, and
   an operation mode is changed over from the usual voltage mode to the low voltage mode when it is determined that the voltage of the electric power supplied to the brake control device becomes lower than the first voltage.

2. The brake control device according to claim 1, wherein the anti-lock brake control is performed such that a pressure increase gradient for the pressure of the brake fluid supplied to the front-wheel-side braking part or the rear-wheel-side braking part is less in the low voltage mode compared to the usual voltage mode.

3. The brake control device according to claim 1, wherein the anti-lock brake control is performed such that a maximum value of a braking force of the front-wheel-side braking part or the rear-wheel-side braking part in the low voltage mode becomes substantially equal to a maximum value of the braking force of the front-wheel-side braking part or the rear-wheel-side braking part in the usual voltage mode.

4. The brake control device according to claim 1, wherein in changing over an operation mode from the usual voltage mode to the low voltage mode, when it is determined that at least one of the front-wheel-side braking part and the rear-wheel-side braking part is in the process of braking generated by a brake operation, the interlocking brake control is maintained in the usual voltage mode until the brake operation is finished.

5. The brake control device according to claim 1, wherein when the operation mode is changed over to the low voltage mode, the low voltage mode is maintained until the supply of electric power to the front-wheel hydraulic circuit, the rear-wheel hydraulic circuit and the electrically-operated pump is stopped.

6. The brake control device according to claim 1, wherein when the voltage of the electric power supplied to the brake control device is lower than the second voltage, the interlocking brake control and the anti-lock brake control are stopped.

* * * * *